(12) United States Patent
Kaitha (10) Patent No.: US 10,885,450 B1
(45) Date of Patent: Jan. 5, 2021

(54) AUTOMATICALLY DETECTING INVALID EVENTS IN A DISTRIBUTED COMPUTING ENVIRONMENT

(71) Applicant: Capital One Services, LLC, McLean, VA (US)

(72) Inventor: Sunil Kaitha, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/540,786

(22) Filed: Aug. 14, 2019

(51) Int. Cl.

| | |
|---|---|
| *G06F 21/31* | (2013.01) |
| *G06F 3/041* | (2006.01) |
| *H04W 12/08* | (2009.01) |
| *H04L 29/06* | (2006.01) |
| *H04N 21/25* | (2011.01) |
| *G06N 5/04* | (2006.01) |
| *H04L 29/08* | (2006.01) |
| *G06N 20/00* | (2019.01) |

(52) U.S. Cl.
CPC .............. *G06N 5/046* (2013.01); *G06N 20/00* (2019.01); *H04L 67/10* (2013.01)

(58) Field of Classification Search
CPC ......... G06N 5/046; G06N 20/00; H04L 67/10
USPC ................................................ 706/1–62; 1/1
See application file for complete search history.

(56) References Cited

U.S. PATENT DOCUMENTS

| | | | |
|---|---|---|---|
| 8,447,859 B2 | 5/2013 | Bobak et al. | |
| 9,635,101 B2 | 4/2017 | Mathur et al. | |
| 9,785,518 B2 | 10/2017 | Kanteti et al. | |
| 2013/0174154 A1* | 7/2013 | Poore | G06F 8/00 718/1 |
| 2015/0154269 A1* | 6/2015 | Miller | G06F 7/24 715/780 |
| 2016/0048408 A1 | 2/2016 | Madhu et al. | |
| 2016/0267525 A1* | 9/2016 | Lin | G06Q 30/0246 |
| 2017/0099278 A1* | 4/2017 | Ducatel | G06F 21/31 |
| 2017/0126734 A1* | 5/2017 | Harney | H04L 61/2069 |
| 2018/0077146 A1* | 3/2018 | Lonas | H04L 63/0823 |
| 2018/0351838 A1 | 12/2018 | Lui | |
| 2019/0018939 A1* | 1/2019 | Lev | H04L 63/102 |

* cited by examiner

*Primary Examiner* — Brandon S Cole
(74) *Attorney, Agent, or Firm* — Sterne, Kessler, Goldstein & Fox P.L.L.C.

(57) ABSTRACT

Described herein is a system for automatically detecting invalid events in a distributed computing environment. The system for automatically detecting invalid events may include sub-systems and a learning engine. The learning engine may generate a rule set for each sub-system specifying circumstances under which an event is considered invalid specific to the sub-system using machine learning. Sub-systems may detect an invalid event being propagated through the distributed computing environment based on a set of rules specifying circumstances under which an event is considered invalid specific to the sub-system and/or metadata of the event.

19 Claims, 7 Drawing Sheets

AUTOMATICALLY DETECTING INVALID EVENTS IN A DISTRIBUTED COMPUTING ENVIRONMENT

BACKGROUND

A distributed computing environment is a network of multiple computing systems including servers and data storage repositories distributed geographically. In a distributed system a specific set of computing systems (i.e., sub-systems) may be responsible for executing specific tasks. The tasks may include, processing data, storing data, computing data, and/or the like. As an example, an occurrence of an event may necessitate completion of multiple different tasks. The event may be propagated through the distributed computing systems across different sets of computing system so that each set of computing systems may execute their assigned task based on the occurrence of the event.

In distributed computing environments invalid events can occur because of system failures or network latency. Invalid events may be stale events being propagated through the distributed computing system. Sub-systems within the distributed computing environments can continue to process invalid or stale events and propagate the invalid or stale events through the environment regardless of the state of the event. This can cause the sub-systems in the environment to process inconsistent or incorrect data of the invalid or stale events. Processing inconsistent or incorrect data may cause other system failures, network congestion, and an inefficient use of operational resources.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION OF THE INVENTION

Described herein is a system for automatically detecting invalid events in a distributed computing environment. The system for automatically detecting invalid events may include sub-systems and a learning engine. The learning engine may generate a rule set for each sub-system specifying circumstances under which an event is considered invalid specific to the sub-system using machine learning. An event may be deemed invalid when the event does not accord with the current state of the distributed computing environment. An invalid event may include data that is incorrect, invalid, inconsistent, and/or the like. Sub-systems may detect an invalid event being propagated through the distributed computing environment based on a set of rules specifying circumstances under which an event is considered invalid specific to the sub-system and/or metadata of the event. The sub-system can re-route the event to the learning engine to confirm the event is in fact invalid, rather than continuing to propagate the event through the distributed computing environment.

By automatically detecting invalid events, the system disclosed herein eliminates further processing of inconsistent or invalid data by not continuing to propagate the event through the distributed computing environment. In this way, the system reduces network latency, risk of further system failures, and an amount of operational resources needed.

Figure 1:
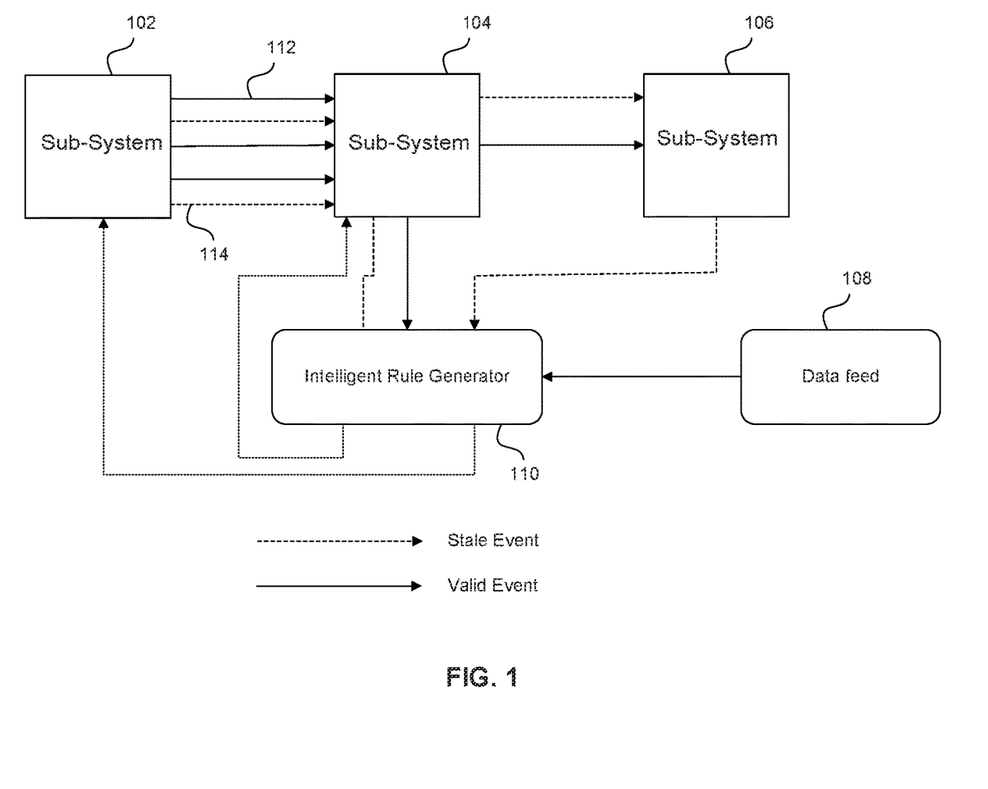
FIG. 1 is a block diagram of the system for automatically detecting invalid events according to an embodiment.

FIG. 1 is a block diagram of the system for automatically detecting invalid events according to an embodiment. The system may include a distributed computing environment. The distributed computing environment may include sub-systems 102, 104, and 106, a data feed 108, and an intelligent rule generator 110. Data feed 108 may include one or more data sources. The data source may be one or more of: internal data repositories (not shown), the sub-systems 102-106, external data repositories, and/or the like.

Data feed 108 may continuously transmit or stream available data to intelligent rule generator 110. The data may include state of different sub-systems in the distributed computing environment, current average processing time for the different sub-systems in the distributed computing environment, load information of the different sub-systems in the distributed computing environment, and/or the like. Intelligent rule generator 110 may be trained to detect and determine circumstances in which an event may be deemed as invalid using the data received from data feed 108.

Different machine learning methodologies may be used to train intelligent rule generator 110. In this configuration, intelligent rule generator 110 may use machine learning to determine which events are valid or invalid in a distributed computing environment based on the received data and a sample set of validity of similar events made by intelligent rule generator 110. More specifically, processing time for the different sub-systems in the distributed computing environment, load information of the different sub-systems in the distributed computing environment, and/or the like may be features input the machine learning algorithm. Additional features may be from the events themselves and their corresponding data. The events may be tags with an indication of whether they are valid or invalid. The sample set may be generated, for example, from a history where events were correctly processed or where past errors or failures occurred. For example, the events may be tags as being failure events when an exception condition in one or more subsystems occurred during processing of the event. Otherwise, the events may be tagged as being valid. Humans may also identify those events that are valid and invalid given the associated features describing the sub-systems' operation.

Based on current and past data, intelligent rule generator 110 may determine whether a sub-system should consider an event valid or invalid, given the circumstances. Intelligent rule generator 110 may use machine learning to generate a rule set for each sub-system in the distributed computing environment. The rule set includes rules to determine circumstances in which the events may be deemed valid or invalid for each specific sub-system. Each rule set may be unique to the sub-system. Intelligent rule generator 110 may transmit each rule set to the corresponding sub-system.

In one embodiment, intelligent rule generator 110 may use a decision tree learning to generate the rules. Decision tree learning generates a decision tree (as a predictive model) to go from observations about an item (represented in the branches) to conclusions about the item's target value (represented in the leaves). Here, the target values whether an event is valid or invalid and the various observations would be the input data. Algorithms, such as Iterative Dichotomizer 3, exist that generate these decision trees in a way that that lowers the overall entropy in a system.

A skilled artisan would recognize that other algorithms may be used as well. For example, different regression, classification, deep learning, and other algorithms exist as well. For example, support vector machines, logistic regression, or another machine learning algorithm may be used to generate a model, which has rules, to identify whether an event is valid or invalid.

In addition, reinforcement learning may be used to train intelligent rule generator 110. Reinforcement learning adapts the model, that is the rules, to new data that is exposed. Reinforcement learning may utilize a back propagation algorithm to adjust the model and rules to comport with new data. For example, when a new event is identified as being invalid, based, for example, on exception or error that occurred somewhere in its processing, the back propagation algorithm may be used to adjust the model.

As described above, various events may be propagated through the distributed computing environment for processing. Events may generated based on user interaction on user interfaces (e.g., web-domains, websites, applications, and/or the like) or internally within the sub-systems of the distributed computing environment. The events may include submission of data from the user interfaces, requests received from the user interfaces, modification of data within the sub-systems, requests for data initiated within the sub-systems, external systems sending events to subsystems, and/or the like. In response to an event being generated metadata for the event is also generated. The metadata may include type of event, location of origination of the event, date the event was originated, an expiration date of the event, intended destination of the event, and/or the like.

As an example, sub-system 102 may transmit three valid events 112 represented by the solid line arrow and two invalid events 114 represented by the dotted line arrows, to sub-system 104.

Sub-system 104 may detect that out of the five received events, two invalid events, based on the rule set of sub-system 104 and/or metadata of the two invalid events. For example, the metadata for the first invalid event may include an expiration date that is past the current date. Sub-system 104 may determine the expiration date of the first invalid event has past and so the first event is invalid. Furthermore, the metadata for the second invalid event may include an origination date and time of the second invalid event in the past. Sub-system 104 may determine the second invalid event is invalid based on a rule in the rule set indicating that events of a specified event type originated after a specified date and time are invalid. For example, the event may be a request received from a user interface and a rule in the rule set of sub-system 104 may indicate that a request may not be able to be processed after a specified amount of time has lapsed as the user session on the user interface may have timed-out. Consequently, the second invalid event is deemed invalid. Sub-system 104 may forward the two invalid events to intelligent rule generator 110. Sub-system 104 may process the three valid events and may forward two events to sub-system 106.

Sub-system 106 may determine of the two events received from sub-system 104, one event is invalid (i.e., a third invalid event in the distributed computing environment) based on the metadata of the event and/or the rule set of sub-system 106. Sub-system 106 may forward the third invalid event to the intelligent rule generator. Sub-system 106 may process the valid event received from the sub-system 104.

Intelligent rule generator 110 may determine whether the invalid events received from sub-system 104 and sub-system 106 are in fact invalid using streams of data received from data feed 108. Intelligent rule generator 110 may confirm the first invalid event and the third event are in fact invalid. As an example, intelligent rule generator 110 may determine the expiration date of the first and third invalid event has past and in turn the first and third invalid event are in fact invalid. However, intelligent rule generator 110 may determine that rule in the rule set of sub-system 104 indicating that a request received from a user interface may not be able to be processed after a specified amount of time has lapsed as the user session on the user interface may have timed-out, is no longer correct as a user session may take a longer amount of time to time-out. In turn, intelligent rule generator 110 may fail confirm that the second invalid event is in fact invalid. Intelligent rule generator 110 may update the rule set of sub-system 104 indicating the updated amount of time a user session on the user interface takes to time-out. Intelligent rule generator 110 may transmit the updated rule set to the sub-system 104.

In an embodiment, each sub-system may break each received event into multiple different elements. For example, an event may be broken down into elements such as: type, origination date and time, expiration date and time, origination location, intended destination, data of the event, expected processing time, resources required to process the event, and/or the like. The sub-systems may assign different weights to the elements signify importance of the element. For example, the expiration date of the event may have a greater weight than origination location. As the sub-systems receive the events, the sub-systems may compare each element of the event to the rule set of the sub-system. For example, the sub-system may compare the elements of the events such as event type, origination location, origination date and time against the rules governing events of a specified type, originating at a specified location, and originating after a specified date and time. The sub-system may generate a score for each event based on the weights assigned to each element and the comparison of each element of the event to the rule set. The score may indicate a likelihood an event is a valid event. In response to the score being lower than a specified threshold, the sub-system may deem the event as invalid.

Figure 2:
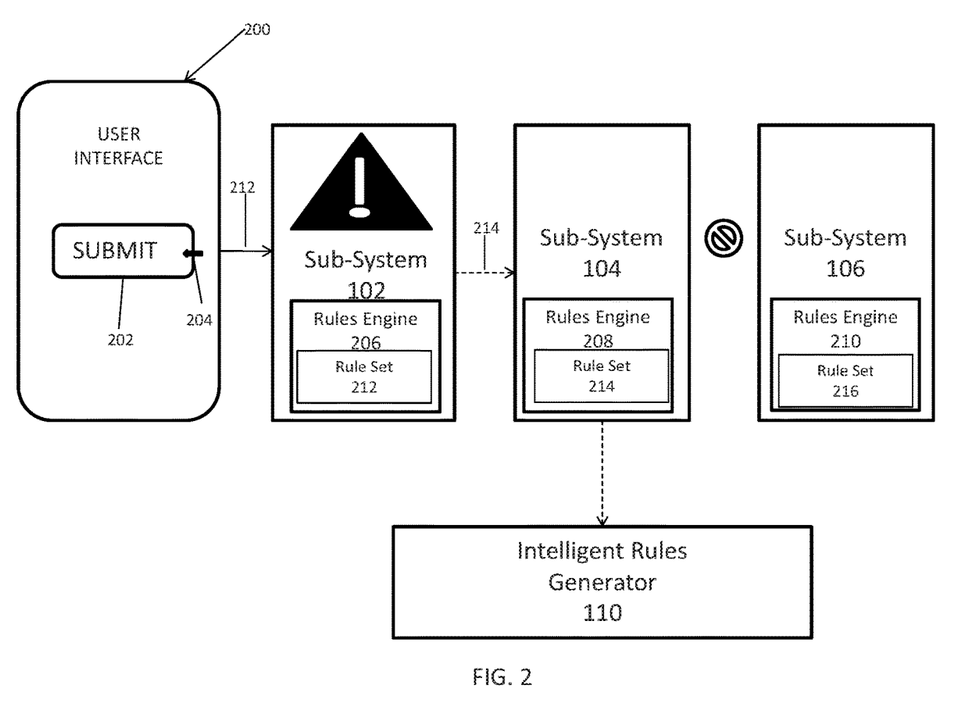
FIG. 2 illustrates an example event propagated through the distributed environment according to an embodiment.

FIG. 2 illustrates an example event propagated through the distributed environment according to an embodiment. As a non-limiting example, the distributed computing environment may include user interface 200, sub-system 102, sub-system 104, sub-system 106, and an intelligent rules generator 110. Sub-system 102 may include rules engine 206, sub-system 104 may include rules engine 208, and sub-system 106 may include rules engine 210. Rules engine 206-210 may store rule sets 212-216 specific to each sub-system 102-106.

Rules engines 206, 208, and 210 may be computing system within a corresponding sub-system 102-106. Rules engines 206, 208, and 210 may store rule sets 212-216 corresponding to sub-systems 102-106 in a data storage device. Rules engines 206, 208, and 210 may be configured to determine whether an event is invalid based on the corresponding rule set 212-216. For example, rules engines 206, 208, and 210 may access the corresponding rule set 212-216 and determine whether an event received at the corresponding sub-system 102-106 is valid or invalid.

Intelligent rules generator 110 may generate rule sets 212-216 for each sub-system 102-106 respectively. The rule sets rule sets 212-216 may govern the circumstances in which an event is considered valid or invalid for each sub-system. Intelligent rules generator 110 may transmit the events to the respective sub-systems 102-106.

User interface 200 may be a website which provides an option to submit an online payment. Sub-system 102 may be responsible for processing the payment. Sub-system 104 may be responsible for storing the payment information. Sub-system 106 may be responsible for generating and transmitting a "thank-you" message for submitting the payment.

The user interface 200 may generate an event 212 of the submission of the online payment in response to actuation of the "SUBMIT" button 202 based on user input 204. Event 212 of the submission of the online payment. As described above, upon the generation of the event 212, metadata for the event may also be generated. The metadata may indicate the event was originated on the user interface 200, the event was a submission of an online payment, the date of the online payment, the time of the online payment, and the intended destination of the event. Sub-system 102 may receive the event 212 (e.g., an indication that the "SUBMIT" button was present) and metadata for the event 212 and may deem the event 212 to be valid based on the rule set 212 in the rules engine 206 and the metadata of the event 212.

Sub-system 102 may process the event 212, however, may crash shortly thereafter, before the event is passed to sub-system 104. Sub-system 102 may remain down for a given amount of time. In response to bringing sub-system 102 back online, sub-system 102 may forward the event 214 and metadata for event 214 to sub-system 104 for further processing. Sub-system 102 may be able to process the event 214 (i.e., store the event) however, may deem it to be invalid based on the rule set of sub-system 104. For example, rules engine 208 of the sub-system 104 may determine that because of the crash of sub-system 102, sub-system 104 has received the event 214 after a given amount of time after the origination of event 214, where the time of origination of event 214 may be determined from the metadata of event 214. A rule in rule set 214 of sub-system 104 may indicate the "thank-you" message for submission of a payment must be generated and transmitted before a specified amount of time has lapsed after the submission of the payment. Rules engine 208 may determine that as the given amount time that has lapsed after the origination of the event 214 is greater than the specified amount of time allotted to send the "thank-you" message for submission of a payment, the event 214 is now invalid for sub-system 106 and should not be forwarded to sub-system 106. Therefore, sub-system 104 does not forward the event 214 to sub-system 106 and rather forwards the event to the intelligent rule generator 110.

Intelligent rule generator 110 may receive streams of data from a data feed. The data may include the state information of each of sub-systems 102-106. Intelligent rule generator 110 may determine the amount of time sub-system 102 crashed and based on the amount of time sub-system 102 crashed, when event 214 was transmitted to sub-system 104. Intelligent rule generator 110 may confirm that as the given amount time that has lapsed after the origination of the event 214 is greater than the specified amount of time allotted to send the "thank-you" message for submission of a payment, the event 214 is invalid.

Figure 3:
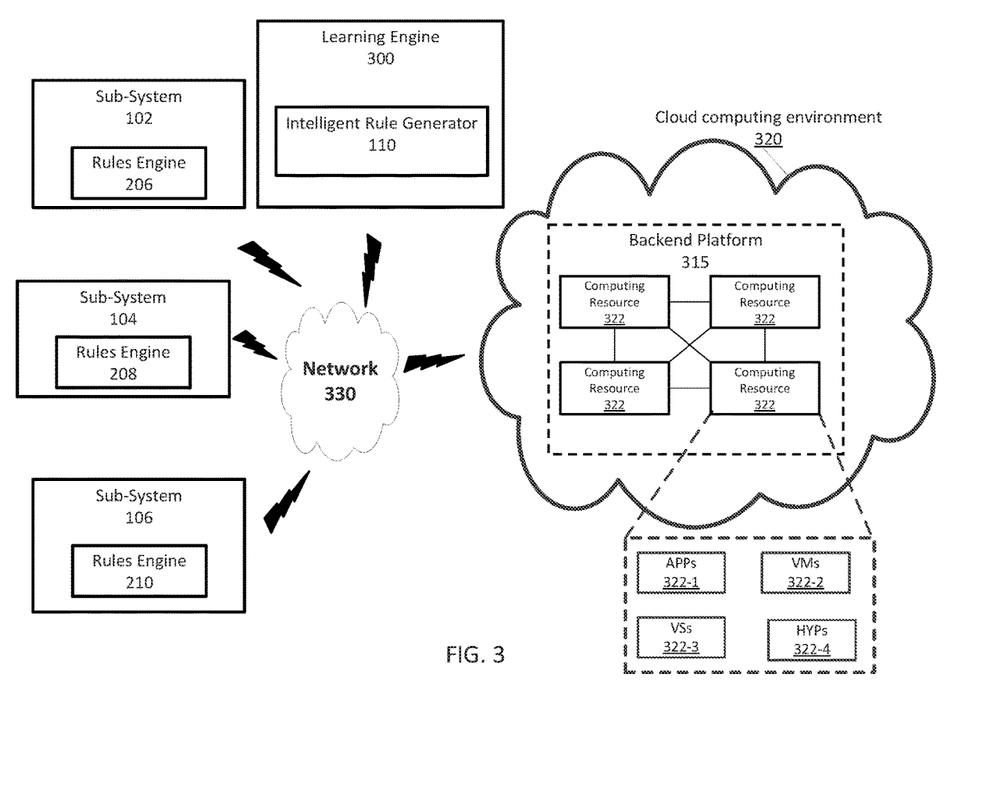
FIG. 3 is a block diagram of an example environment in which systems and/or methods for automatically detecting invalid events may be implemented.

FIG. 3 is a block diagram of an example environment 300 in which systems and/or methods described herein may be implemented. The environment 300 may include sub-systems 102-106, a learning engine 300, a backend platform 315, a cloud computing environment 320, and a network 330. Learning engine 300 may implement the intelligent rule generator 110. Sub-systems 102-106 may include rules engines 206-210, respectively. The devices of the environment 300 may be connected through wired connections, wireless connections, or a combination of wired and wireless connections.

In an example embodiment, one or more portions of the network 330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user device 140 may include a communication and/or computing device, such as a desktop computer, mobile device, smartphone, tablet, subnotebook, laptop, personal digital assistant (PDA), gaming device, device integrated with a vehicle, a wearable communication device (i.e., a smart wristwatch, smart eyeglasses, etc. . . . ) and/or any other suitable computing device. The user device 140 may execute an application 142 which is configured to communicate with the cloud computing environment 320.

The backend platform 315 may include a server or a group of servers. In an embodiment, the backend platform 315 may be hosted in a cloud computing environment 320. It may be appreciated that the backend platform 315 may not be cloud-based, or may be partially cloud-based.

The cloud computing environment 320 includes an environment that delivers computing as a service, whereby shared resources, services, etc. may be provided to sub-systems 102-106, the learning engine 110 and/or the backend platform 315. The cloud computing environment 320 may provide computation, software, data access, storage, and/or other services that do not require end-user knowledge of a physical location and configuration of a system and/or a device that delivers the services. The cloud computing system 320 may include computer resources 322.

Each computing resource 322 includes one or more personal computers, workstations, computers, server devices, or other types of computation and/or communication devices. The computing resource(s) 322 may host the backend platform 315. The cloud resources may include compute instances executing in the cloud computing resources 322. The cloud computing resources 322 may communicate with other cloud computing resources 322 via wired connections, wireless connections, or a combination of wired or wireless connections.

Computing resources 322 may include a group of cloud resources, such as one or more applications ("APPs") 322-1, one or more virtual machines ("VMs") 322-2, virtualized storage ("VS") 322-3, and one or more hypervisors ("HYPs") 322-4.

Application 322-1 may include one or more software applications that may be provided to or accessed by the user device 140. In an embodiment, the application 204 may execute locally on the user device 140. Alternatively, the application 322-1 may eliminate a need to install and execute software applications on the user device 140. The application 322-1 may include software associated with backend platform 315 and/or any other software configured to be provided across the cloud computing environment 320. The application 322-1 may send/receive information from one or more other applications 322-1, via the virtual machine 322-2.

Virtual machine 322-2 may include a software implementation of a machine (e.g., a computer) that executes programs like a physical machine. Virtual machine 322-2 may be either a system virtual machine or a process virtual machine, depending upon the use and degree of correspondence to any real machine by virtual machine 322-2. A system virtual machine may provide a complete system platform that supports execution of a complete operating system (OS). A process virtual machine may execute a single program and may support a single process. The virtual machine 322-2 may execute on behalf of a user (e.g., user device 140) and/or on behalf of one or more other backend platforms 315, and may manage infrastructure of cloud computing environment 320, such as data management, synchronization, or long duration data transfers.

Virtualized storage 322-3 may include one or more storage systems and/or one or more devices that use virtualization techniques within the storage systems or devices of computing resource 322. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 322-4 may provide hardware virtualization techniques that allow multiple operations systems (e.g., "guest operating systems") to execute concurrently on a host computer, such as computing resource 322. Hypervisor 322-4 may present a virtual operating platform to the guest operating systems, and may manage the execution of the guest operating systems multiple instances of a variety of operating systems and may share virtualized hardware resource.

Cloud computing environment 320 may host a data feed (e.g., data feed 110 as shown and described with respect to FIG. 1) which streams data to learning engine 300. It may be appreciated that sub-systems 102-106 and learning engine 300 may be hosted by cloud computing environment 320. Alternatively, sub-systems 102-106 and learning engine 300 may reside outside cloud computing environment 320. Alternatively, a portion of sub-systems 102-106 and learning engine 300 may reside outside cloud computing environment 320 while the remainder portion of sub-systems 102-106 and learning engine 300 may be hosted by cloud computing environment 320.

It can be appreciated learning engine 300 may be a part of the distributed computing environment including sub-systems 102-106 and cloud computing environment 320. Alternatively, learning engine 300 may reside outside the distributed computing environment and may be in communication with multiple different distributed computing environments including different sub-systems and cloud computing environments.

Figure 4:
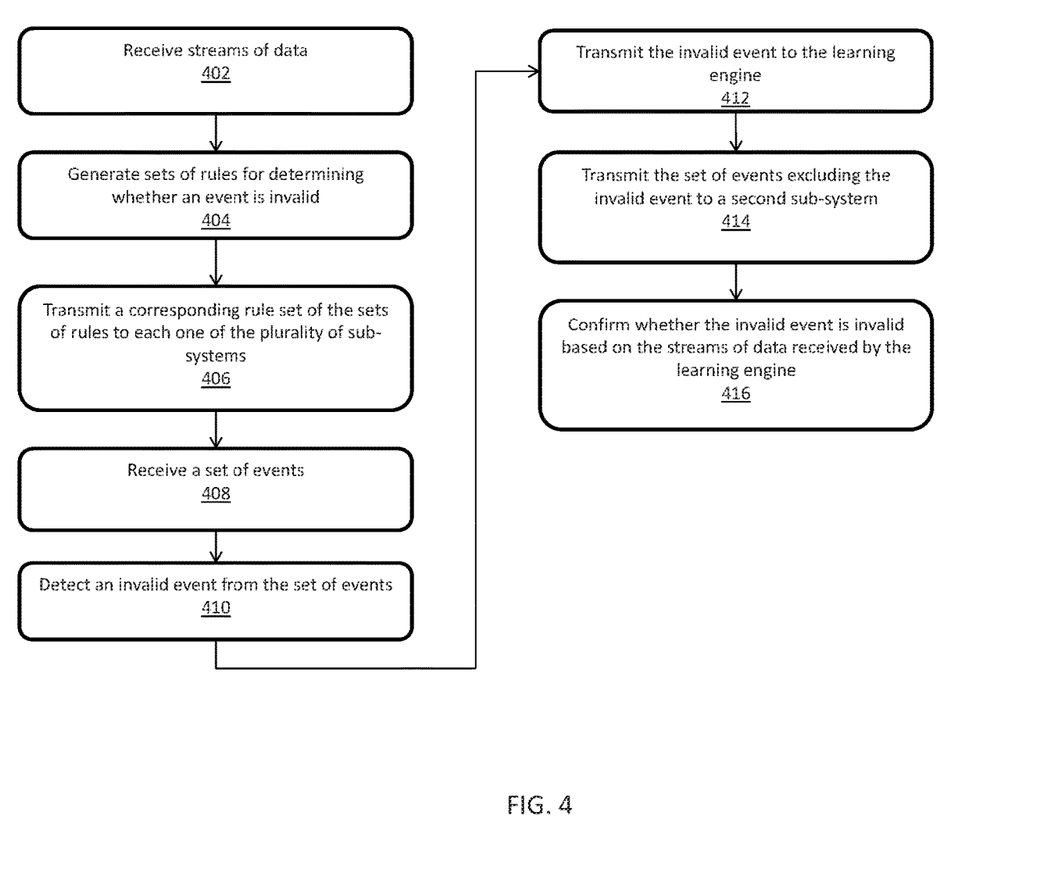
FIG. 4 is a flowchart illustrating a process for automatically detecting invalid events according to an embodiment.

FIG. 4 is a flowchart 400 illustrating a process implemented by a system for automatically detecting invalid events in a distributed computing environment according to an embodiment.

Flowchart 400 starts at operation 402. In operation 402, a learning engine may receive streams of data from various data sources. The data sources may be databases, data repositories, any of the different sub-systems of the distributed computing environment, external sources, and/or the like. The learning engine may be trained using the streams of data from various sources. The streams of data may include one or more of: state information of each of the sub-systems, processing time information of each of the sub-systems, or load information of each of the sub-systems. The state information may indicate a sub-system is active, has shut-down, has crashed, is running slower than usual, and/or the like. The processing time information may include an average processing time of a sub-system. The load information may include amount of data load a sub-system is capable of processing and how much the sub-system is currently processing. An invalid event is one that is no longer accords with a state of the distributed computing environment.

In operation 404, based on the streams of data training the learning engine, the learning engine may generate sets of rules for determining whether an event is invalid for each of the sub-systems. Each rule set of the sets of rules specifies the circumstance under which an event is considered invalid at a sub-system of the plurality of sub-systems. Different machine learning methodologies may be used to train the learning engine. For example, reinforcement learning may be used to train the learning engine. The learning engine may use reinforcement learning to determine which events are valid or invalid in a distributed computing environment based on the received data and past determinations on validity of similar events made by learning engine. The learning engine may use reinforcement learning to generate rules, indicating circumstances in which an event is invalid, in a rules set for each sub-system in the distributed computing environment.

In operation 406, the learning engine may transmit a corresponding rule set of the sets of rules to each one of the plurality of sub-systems.

In operation 408, a first sub-system may receive a set of events. The first sub-system may receive the set of events from anyone of the other sub-systems, a webpage, or external sources. Each event may include multiple different elements. Each event may also include metadata. The metadata may include one or more of: an expiration date of the event, an origination location of the event, the date the event originated, or an intended destination of the event. The first sub-system may process the valid events.

In operation 410, the first sub-system may detect an invalid event from the set of events based on the rule set specifying the circumstance under which an event is considered invalid at the first sub-system. The first sub-system may also use the metadata to detect the invalid event. For example, the first sub-system may detect that an event's expiration date has past based on the expiration date in the metadata and in-turn the event is invalid.

In operation 412, the first-sub system may transmit the invalid event to the learning engine.

In operation 414, the first sub-system may transmit the set of events excluding the invalid event, to a second sub-system.

In operation 416, the learning engine may determine whether the invalid event is invalid based on the streams of data received by the learning engine. For example, the learning engine may determine whether any current data has changed and/or affected the rules used by the first sub-system to determine whether a rule is invalid.

Figure 5:
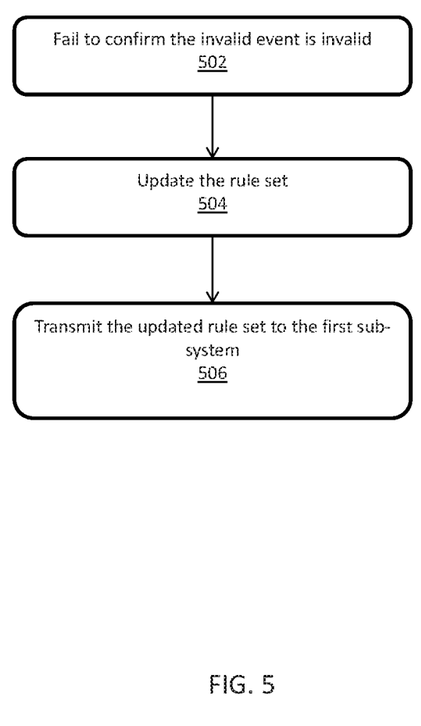
FIG. 5 is a flowchart illustrating a process for automatically detecting invalid events according to an embodiment.

FIG. 5 is a flowchart 500 illustrating a process implemented by a system for a system for automatically detecting invalid events in a distributed computing environment according to an embodiment. Flowchart 500 illustrates the process of the confirming whether the invalid event is invalid based on the streams of data received by the learning engine.

In operation 502, the learning engine may fail to confirm that the invalid event is in fact invalid. The learning engine may determine based on the current data the rule of the rule set of the first sub-system, indicating that the invalid event is invalid, is no longer correct.

In operation 504, the learning engine may update the rule set for each of the sub-systems. The rule sets may include updated and/or new rules based on the current data being streamed to learning engine. Continuing with the earlier example, the learning engine may update the rule identified to be incorrect based on the current data.

In operation 506, the learning engine may transmit the updated rule set to the first sub-system. The first sub-system may apply the updated rule set in future circumstances.

Figure 6:
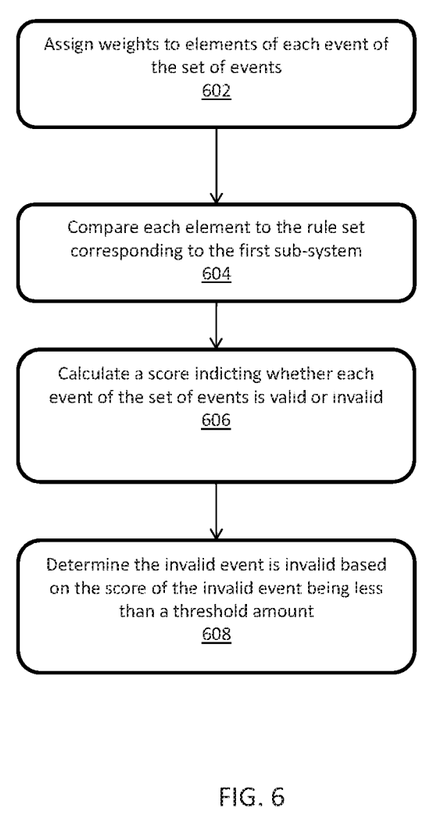
FIG. 6 is a flowchart illustrating a process for automatically detecting invalid events according to an embodiment.

FIG. 6 is a flowchart 600 illustrating a process implemented by a system for a system for automatically detecting invalid events in a distributed computing environment according to an embodiment.

In operation 602, the first sub-system may assign weights to the various elements of an event. The first sub-system may also break the event into different elements before assigning weights to the various elements. The larger the weight may indicate more importance/significance to the specific element. For example, an event may be broken down into elements such as: type, origination date and time, expiration date and time, origination location, intended destination, data of the event, expected processing time, resources required to process the event, and/or the like. The expiration date of the event may have a greater weight than origination location.

In operation 604, the first sub-system may compare each element to the rule set corresponding to the respective sub-system. For example, the sub-system may compare the elements of the events such as event type, origination location, origination date and time against the rules governing events of a specified type, originating at a specified location, and originating after a specified date and time.

In operation 606, the first sub-system may calculate a score indicating whether each event of the set of events is valid or invalid. The score may be calculated based on the weights assigned to each element and the comparison of each element to the rule set corresponding to the respective sub-system. The score may indicate a likelihood an event is a valid event.

In operation 608, the first sub-system may determine that invalid event is invalid based on the score of the invalid event being less than a threshold amount.

Figure 7:
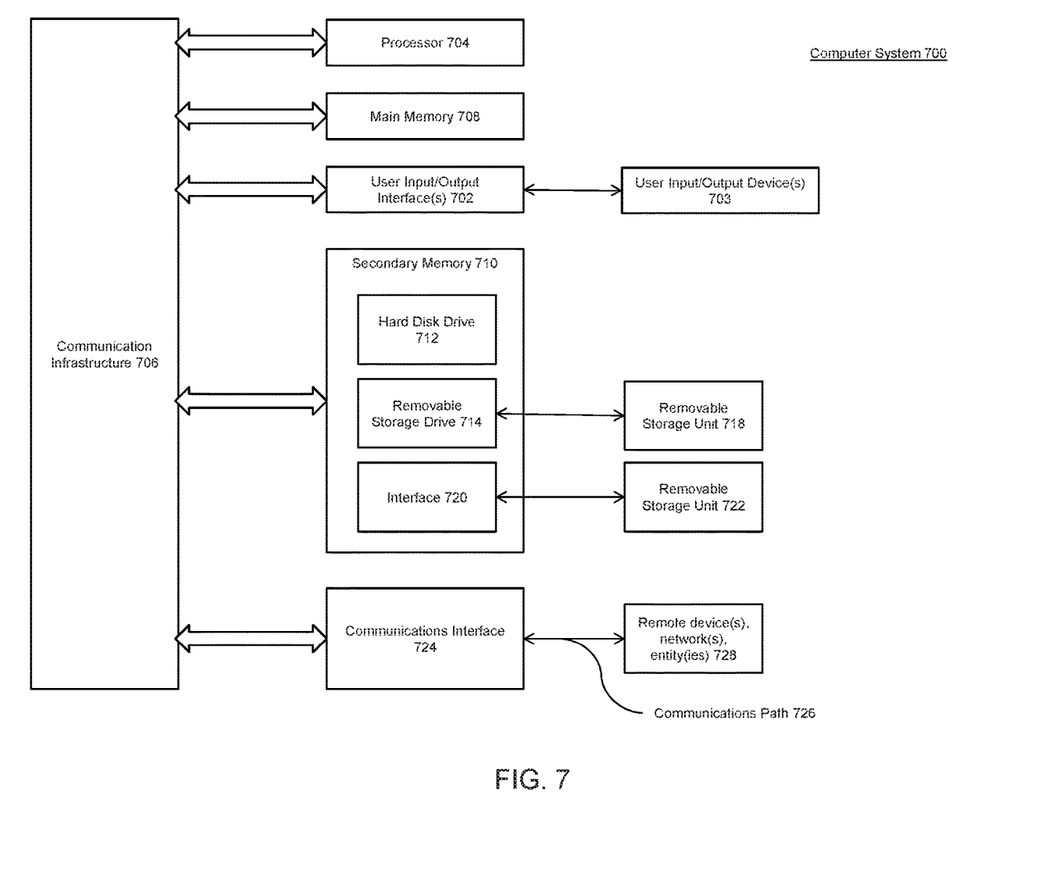
FIG. 7 is a block diagram of example components of device according to an embodiment.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718.

Removable storage unit 718 may include a computer usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for detecting invalid events in a distributed computing environment, the method comprising:

receiving, by a learning engine, streams of data from each of a plurality of data sources wherein the learning engine is trained to detect whether an event in the distributed computing environment is invalid using the streams of data including information about each of a plurality of sub-systems, wherein an invalid event is one that no longer accords with a state of the distributed computing environment and wherein each of the plurality of sub-systems is responsible for completing a different assigned task based on received events;

based on the streams of data training the learning engine, generating, by the learning engine, sets of rules for determining whether an event is invalid for each of the plurality of sub-systems, wherein each rule set of the sets of rules specifies a circumstance under which an event is considered invalid at a respective sub-system of the plurality of sub-systems and whether the sub-system is able to complete the assigned task;

transmitting, by the learning engine, a corresponding rule set of the sets of rules to each one of the plurality of sub-systems;

receiving, by a first sub-system of the plurality of sub-systems, a set of events;

breaking down, by the first sub-system, each event of the set of events into elements;

assigning, by the first sub-system, weights to each of the elements of each event of the set of events, wherein a given weight of a given element is assigned based on the rule-set corresponding to the first sub-system;

comparing, by the first sub-system, each element to the rule set corresponding to the first sub-system;

calculating, by the first sub-system, a score indicating whether each event of the set of events is valid or invalid based on the weights assigned to each element of each event and the comparison of each element to the rule set corresponding to the first sub-system, which specifies the circumstance under which an event is considered invalid at the first sub-system; and determining, by the first sub-system, the invalid event is invalid based on the score of the invalid event being less than a threshold amount;

transmitting, by the first sub-system, the invalid event to the learning engine;

transmitting, by the first sub-system, the set of events, excluding the invalid event, to a second sub-system;

confirming, via the learning engine, whether the invalid event is invalid based on the streams of data received by the learning engine; and preventing the invalid event from being propagated to remaining sub-systems of the plurality of sub-systems.

2. The method of claim 1, wherein each event of the set of events includes metadata.

3. The method of claim 2, further comprising determining, by the first sub-system, the invalid event is invalid based on the rule set specifying the circumstance under which an event is considered invalid at the first sub-system and the metadata of the invalid event.

4. The method of claim 3, wherein the metadata includes one or more of: an expiration date of the event, an origination location of the event, an origination date of the event, or an intended destination of the event.

5. The method of claim 1, wherein the streams of data include one or more of: state information of each of the plurality of sub-systems, processing time information of each of the plurality of sub-systems, or load information of each of the plurality of sub-systems.

6. The method of claim 1, further comprising, in response to the learning engine failing to confirm the invalid event is invalid:

updating, by the learning engine, the rule set specifying the circumstance under which an event is considered invalid at the first sub-system, indicating that the invalid event considered invalid by the first sub-system, is a valid event; and transmitting, by the learning engine, the updated rule set to the first sub-system.

7. The method of claim 1, wherein the invalid event is expired, contains invalid data, or contains inconsistent data.

8. A system for detecting invalid events in a distributed computing environment, the system comprising:

a first memory;

a first processor in communication with the first memory and configured to execute a learning engine, the learning engine when executed configured to:

receive streams of data including information about each of a plurality of sub-systems, from each of a plurality of data sources, wherein the learning engine is trained to detect whether an event in the distributed computing environment is invalid using the streams of data, wherein an invalid event is one that no longer accords with a state of the distributed computing environment and wherein each of the plurality of sub-systems is responsible for completing a different assigned task based on received events;

based on the streams of data training the learning engine, generate sets of rules for determining whether an event is invalid for each of the plurality of sub-systems, wherein each rule set of the sets of rules specifies a circumstance under which an event is considered invalid at a sub-system of the plurality of sub-systems and whether the sub-system is able to complete the assigned task; and transmit a corresponding rule set of the sets of rules to each one of the plurality of sub-systems;

a second memory; and a second processor in communication with the second memory and configured to execute a first sub-system of the plurality of sub-systems, the first sub-system when executed configured to:

receive a set of events;

breakdown each event of the set of events into elements;

assign weights to each of the elements of each event of the set of events, wherein a given weight of a given element is assigned based on the rule-set corresponding to the first sub-system;

compare each element to the rule set specifying the circumstance under which an event is considered invalid at the first sub-system;

calculate a score indicating whether each event of the set of events is valid or invalid based on the weights assigned to each element of each event and the comparison of each element to the rule set corresponding to the rule set which specifies the circumstance under which an event is considered invalid at the first sub-system;

identify the invalid event from the set of events based on the score of the invalid event being less than a threshold amount;

transmit the set of events, excluding the invalid event, to a second sub-system; and prevent the invalid event from being propagated to remaining sub-systems of the plurality of sub-systems.

9. The system of claim 8, wherein the first sub-system when executed configured to transmit the invalid event to the learning engine.

10. The system of claim 9, wherein the learning engine when executed is configured to confirm whether the invalid event is invalid based on the streams of data received by the learning engine.

11. The system of claim 10, wherein in response to failing to confirm the invalid event is invalid, the learning engine when executed is further configured to:

update the rule set specifying the circumstance under which an event is considered invalid at the first sub-system, indicating that the invalid event considered invalid by the first sub-system, is a valid event; and transmit the updated rule set to the first sub-system.

12. The system of claim 8, wherein each event of the set of events includes metadata.

13. The system of claim 12, wherein the first sub-system when executed is further configured to determine the invalid event is invalid based on the rule set specifying the circumstance under which an event is considered invalid at the first sub-system and the metadata of the invalid event.

14. The system of claim 13, wherein the metadata includes one or more of: an expiration date of the event, an origination location of the event, an origination date of the event, or an intended destination of the event.

15. The system of claim 8, wherein the streams of data include one or more of: state information of each of the plurality of sub-systems, processing time information of each of the plurality of sub-systems, or load information of each of the plurality of sub-systems.

16. The system of claim 8, wherein the invalid event is expired, contains invalid data, or contains inconsistent data.

17. A non-transitory computer readable medium storing instructions that when executed by one or more processors of a device cause the one or more processors to:

receive streams of data including information about each of a plurality of sub-systems, from each of a plurality of data sources, wherein a learning engine is trained to detect whether an event in a distributed computing environment is invalid using the streams of data, wherein an invalid event is one that no longer accords with a state of the distributed computing environment and wherein each of the plurality of sub-systems is responsible for completing a different assigned task based on received events;

based on the streams of data training the learning engine, generate sets of rules for determining whether an event is invalid for each of the plurality of sub-systems, wherein each rule set of the sets of rules specifies a circumstance under which an event is considered invalid at a sub-system of the plurality of sub-systems and whether the sub-system is able to complete the assigned task;

transmit, by the learning engine, a corresponding rule set of the sets of rules to each one of the plurality of sub-systems;

receive, by a first sub-system of the plurality of sub-systems, a set of events;

breakdown, by the first sub-system, each event of the set of events into elements;

assign, by the first sub-system, weights to each of the elements of each event of the set of events, wherein a given weight of a given element is assigned based on the rule-set corresponding to the first sub-system;

compare, by the first sub-system, each element to the rule set corresponding to the first sub-system;

calculate, by the first sub-system, a score indicating whether each event of the set of events is valid or invalid based on the weights assigned to each element of each event and the comparison of each element to the rule set corresponding to the first sub-system, which specifies the circumstance under which an event is considered invalid at the first sub-system;

identify, by the first sub-system, the invalid event from the set of events based on the score of the invalid event being less than a threshold amount;

transmit, by the first sub-system, the set of events, excluding the invalid event, to a second sub-system;

confirm, via the learning engine, whether the invalid event is invalid based on the streams of data received by the learning engine; and prevent, by the first sub-system, the invalid event from being propagated to remaining sub-systems of the plurality of sub-systems.

18. The non-transitory medium of claim 17, wherein the instructions that when executed by the one or more processors of a device cause the one or more processors to: determine, by the first sub-system, the invalid event is invalid based on the rule set specifying the circumstance under which an event is considered invalid at the first sub-system and metadata of the invalid event.

19. The non-transitory medium of claim 18, wherein the metadata includes one or more of: an expiration date of the event, an origination location of the event, an origination date of the event, or an intended destination of the event.

* * * * *